United States Patent
Nakano et al.

[19]

[11] Patent Number: 5,901,074
[45] Date of Patent: May 4, 1999

[54] CALCULATION DATA DISPLAY DEVICES AND METHODS

[75] Inventors: Yukihiro Nakano, Akishima; Takuya Mashimo, Tokyo; Makoto Takenaka, Higashiyamato; Teiji Shindo, Fussa; Tomoaki Satoh, Hannou; Mitsuru Okano, Fussa; Yoshinori Asayama, Hamura, all of Japan

[73] Assignee: Casio Computer Co., Ltd., Tokyo, Japan

[21] Appl. No.: 08/681,011

[22] Filed: Jul. 22, 1996

[30] Foreign Application Priority Data

Jul. 31, 1995 [JP] Japan ................................ 7-194756

[51] Int. Cl.⁶ .......................... G06F 3/023; G06F 3/147
[52] U.S. Cl. .......................... 364/709.12; 364/710.1; 364/710.11; 364/710.14
[58] Field of Search ................ 364/709.12, 709.15, 364/709.16, 710.1, 710.11, 710.14

[56] References Cited

U.S. PATENT DOCUMENTS

| | | | |
|---|---|---|---|
| 5,126,958 | 6/1992 | Genda | 364/710.11 |
| 5,381,353 | 1/1995 | Oba | 364/710.11 |
| 5,432,721 | 7/1995 | Satoh | 364/710.1 |
| 5,581,677 | 12/1996 | Myers et al. | 395/140 |
| 5,680,638 | 10/1997 | Satoh | 364/709.12 |

*Primary Examiner*—David H. Malzahn
*Attorney, Agent, or Firm*—Frishauf, Holtz, Goodman, Langer & Chick

[57] ABSTRACT

A calculation data display device includes a display which displays input calculation data in colors. When specified calculation data is input, the calculation data display device displays the calculation data input after the specified calculation data in a color different from a regular color. The calculation data displayed in the different color is operated as calculation data belonging to the specified calculation data. First, when the specified calculation data is input in the calculation data inputting process, the calculation data input after the specified calculation data is displayed in a color different from the regular one until the user inputs releasing data. When the input calculation data is operated, the data displayed in the color different from the regular one is operated as the data belonging to the specified data input immediately before the data displayed in the different color.

15 Claims, 13 Drawing Sheets

CALCULATION DATA DISPLAY DEVICES AND METHODS

BACKGROUND OF THE INVENTION

1. Field of the Invention

The present invention relates to calculation data display devices and methods for displaying input calculation data.

2. Description of the Related Art

Recently, computers and even electronic calculators which are small-sized and generally widely used, have become capable of performing various complicated operations including general calculations of arithmetic operations, function calculations, calculations using square roots, calculations of any selected ones of angle units (degrees, radians or grades) or any one of base numbers which include binary, octal, decimal and hexadecimal numbers, or calculations using programmed calculation expressions.

In such a case, the calculation expressions contain numerals, symbols and/or operators corresponding to the respective calculations. In the conventional computer, the calculation expressions sequentially keyed-in and displayed are all displayed in the same color.

Thus, it can not be recognized at a glance where the current keyed-in data is positioned, what the current keyed-in data belongs to, or what unit the keyed-in data has. In order to avoid this undesirable situation, for example, the unit or kind of data is expressed or displayed with a symbol in a specified area on the display screen.

SUMMARY OF THE INVENTION

It is therefore an object of the present invention to provide a calculation data display device which enables a user to recognize at a glance the input state of a calculation or operation expression including a range of numerical values covered by a symbol, and which enables the user to set units of numeral values.

In order to achieve the above object, according to the present invention, there is provided a calculation data display device, comprising:

calculation data input means for inputting calculation data;

display means for displaying the calculation data input by said calculation data input means;

detecting means, responsive to the calculation data sequentially input by the calculation data input means, for detecting a possible predetermined specified one of the input calculation data; and display control means, responsive to the detecting means detecting the specified calculation data, for displaying in different types of display the calculation data input before and after the specified calculation data.

DESCRIPTION OF THE PREFERRED EMBODIMENTS

An embodiment of the present invention will be described below with reference to the drawings.

Figure 1:
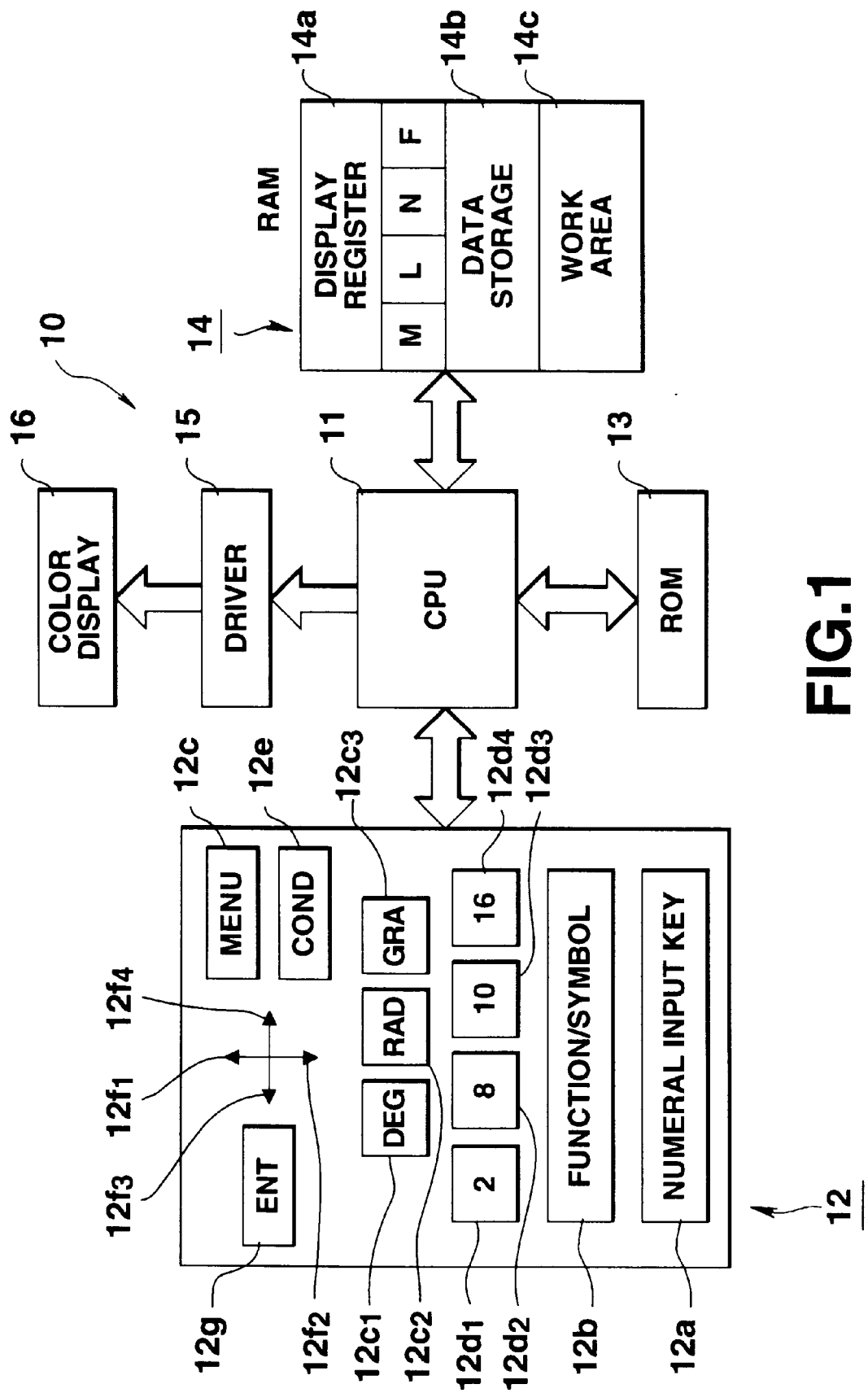
FIG. 1 is a block diagram indicative of the structure of an electronic circuit of a calculation data display device as an embodiment of the present invention.

FIG. 1 is a block diagram indicative of the structure of an electronic circuit of a calculation data display device 10 as an embodiment of the present invention.

The calculation data display device 10 includes a CPU 11, which starts up a system program stored beforehand in a ROM 13 in accordance with a keyed-in signal from a key-in unit 12 to thereby control the respective circuit elements. CPU 11 is connected to the key-in unit 12, ROM 13, as well as to a RAM 14 and a color liquid crystal display 16 via a color display driver 15.

The key-in unit 12 is provided with a numeral input key sub-unit $12a$; a function/symbol key sub-unit $12b$; a "menu" key $12c$; an angle unit setting key unit including a "DEG" (degree) key $12c_1$, "RAD" (radian) key $12c_2$, and "GRA" (grade) key $12c_3$; base setting keys including a binary "2" key $12d_1$, an octal "8" key $12d_2$, a decimal "10" key $12d_3$, and a hexadecimal "16" key $12d_4$; a condition "COND" key $12e$; cursor keys "" $12f_1$, "⌈ $12f_2$, "←" $12f_3$, and "→" $12f_4$; and an enter "ENT" key $12g$.

The numeral input key unit $12a$ has a ten-key sub-unit (not shown) of keys "0"–"9", a decimal point ".", which are key operated to input numbers and a decimal point, respectively.

The function/symbol key unit $12b$ has symbol keys (not shown) which include arithmetic operation keys including "+", "−", "×", "÷", and "=" keys.

The function/symbol key unit $12b$ also includes prefix operator keys such as trigonometric function keys "sin", "cos" and "tan", square and cubic root keys "√" and "³√", common and natural logarithmic keys "log" and "ln", and exponential function keys "$e^x$" and "$10^x$". In addition, the function/symbol key unit 12b also includes an "AC" key, and symbol keys including a "C" key, and an open bracket "(" key and a closing bracket ")" key which are operated to input a calculation or operation expression in conjunction with the numeral input key sub-unit 12a.

The "menu" key 12c is operated to display a menu selection screen to select a desired calculation mode, for example, from five kinds of calculation modes (a general calculation mode, a function calculation mode, an angle calculation mode, an N-ary calculation mode and a program calculation mode).

The angle unit setting key "DEG" $12c_1$, "RAD" $12c_2$, or "GRA" $12c_3$ is operated to select an angle unit "DEG", "RAD" or "GRA" and designate the kind of an input numerical value in the set angle calculation mode.

The N-ary setting keys "2" $12d_1$, "8" $12d_2$, "10" $12d_3$ and "16" $12d_4$ are operated to select the corresponding binary, octal, decimal and hexadecimal bases and to designate the corresponding kinds of input numerical values, respectively, in the set N-ary calculation mode.

The "COND" key 12e is operated to set conditions corresponding to the result of the calculation in the set program calculation mode.

The cursor keys "", "⌈", "←", "→" $12f_1$, $12f_2$, $12f_3$, and $12f_4$ are operated to move the corresponding cursors on the display screen and to select corresponding data.

The "ENT" key 12g is operated to command a change of the mode to a calculation mode selected in the menu and to fix set conditions.

ROM 13 contains a system program which controls the operation of the whole electronic circuit of this device, and subprograms which include a general calculation program, a function calculation program, an angle calculation program, a N-ary calculation program and a program calculation mode program corresponding to various operational modes.

RAM 14 includes a display register 14a, a data storage 14b, a work area 14c, a mode flag register M, a function key register L, an angle key register F and an N-ary key register N.

The display register 14a stores in the form of a bit map color display data to be displayed on the display 16.

The data storage 14b stores the calculation or operation expression data input and displayed by the operation of the key-in unit 12, data on the result of the calculation, and set condition data.

Various data are input to/read from the work area 14c as required depending on various calculations made in CPU 11.

The mode flag register M stores flag data indicative of a calculation mode selected and set on the basis of the menu selection screen for the calculation modes.

When any one of the prefix operator keys such as "sin", "cos", "tan" or "√" of the function/symbol key unit 12b is operated, "1" is set in the function/square root key register L. When the "⌈" key $12f_2$ indicative of release of the set state of such function is operated, "0" is set in the register L.

When the "DEG" key $12c_1$ is operated, "1" is set in the angle key register F; when "RAD" key $12c_2$ is operated, "2" is set; and when "GRA" key $12c_3$ is operated, "3" is set.

When the "2" key $12d_1$ is operated, "1" is set in the N-ary register N; when the "8" key $12d_2$ is operated, "2" is set; when the "10" key $12d_3$ is operated, "3" is set; and when the "16" key $12d_4$ is operated, "4" is set.

The operation of the inventive calculation data display device will be described next.

Figure 2:
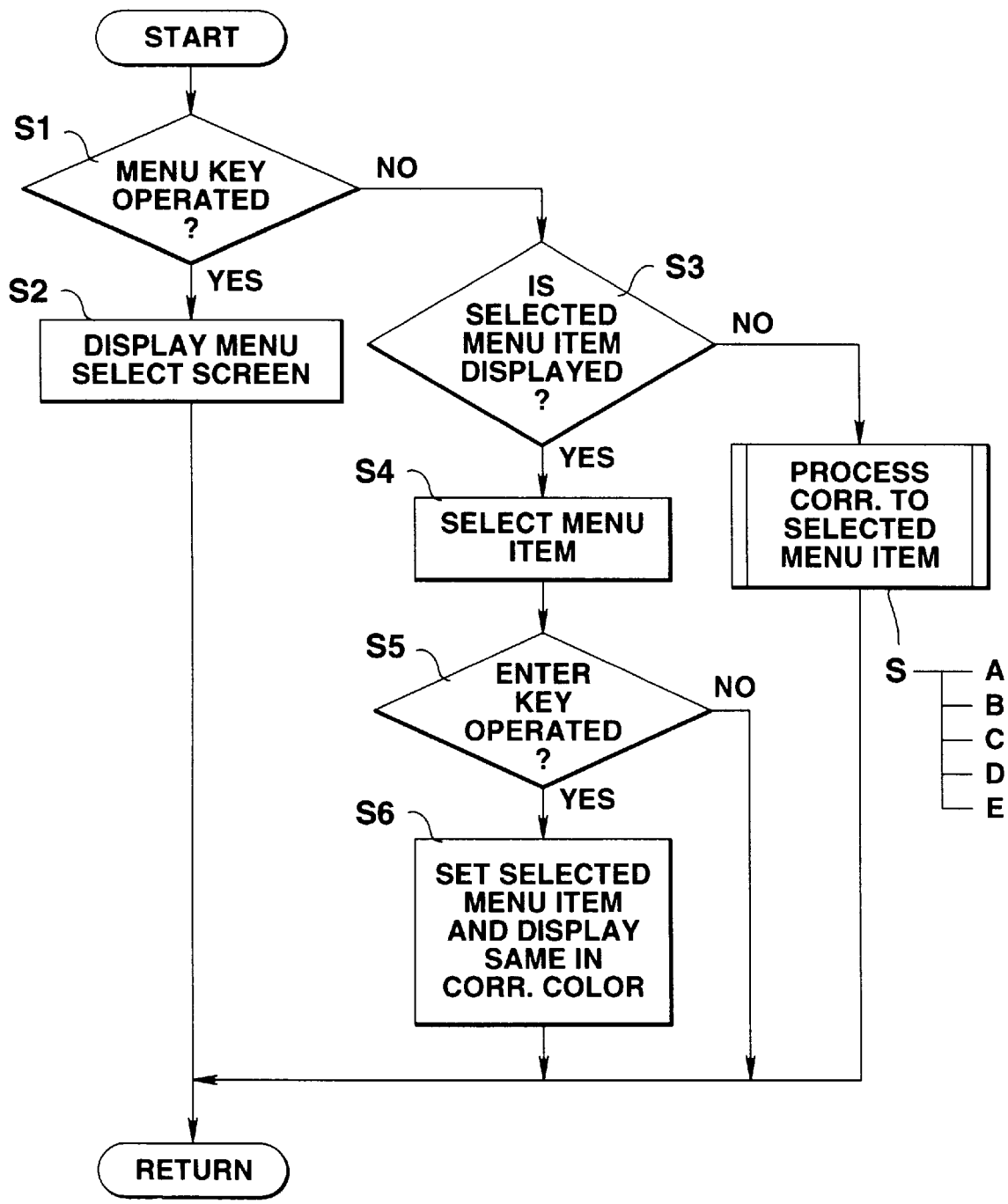
FIG. 2 is a flow chart indicative of the whole process performed by the calculation data display device.

FIG. 2 is a flow chart indicative of the whole process performed by the calculation data display device.

Figure 3:
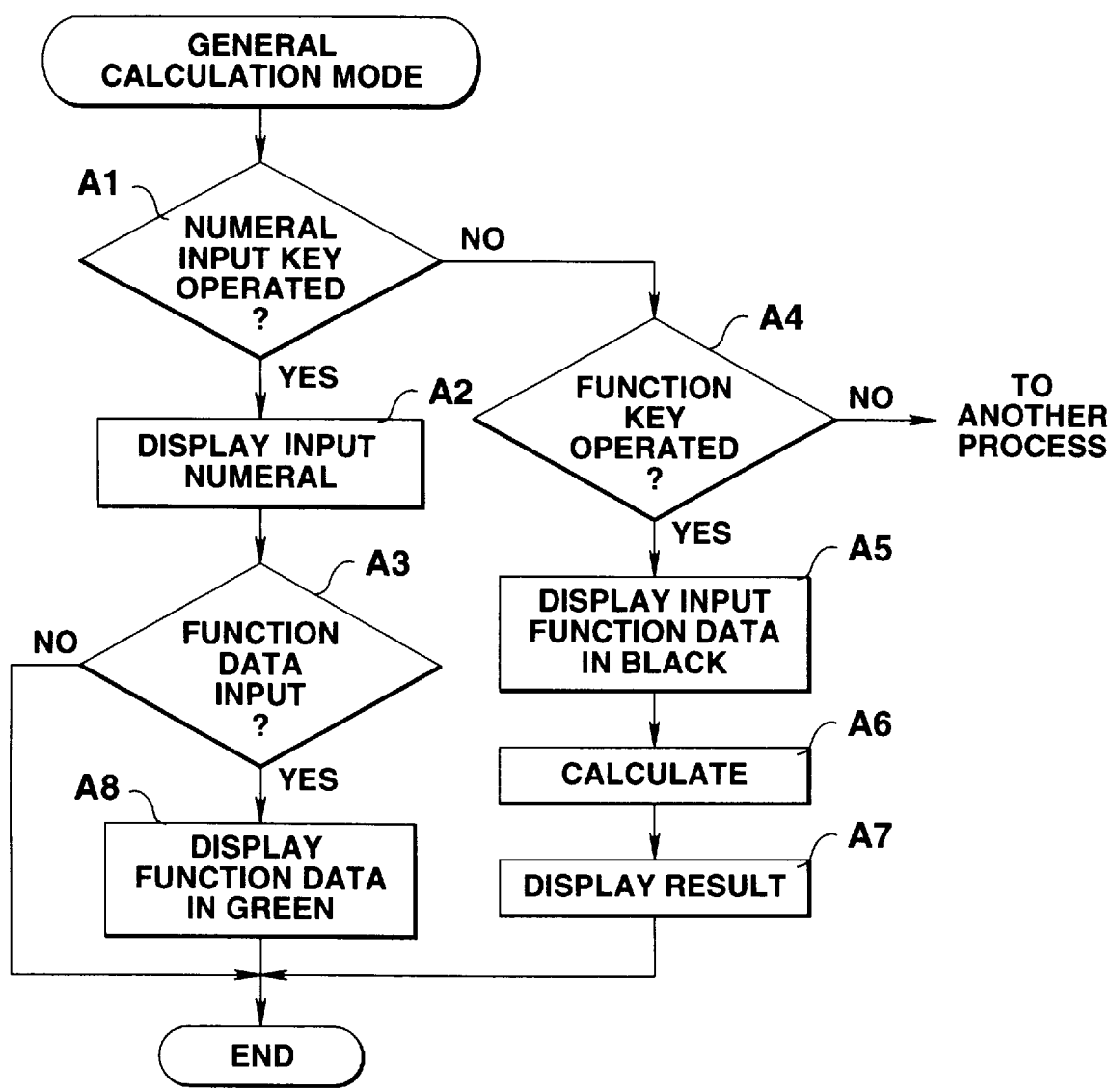
FIG. 3 is a flow chart indicative of a general calculation process performed by the calculation data display device.

FIG. 3 is a flow chart indicative of a general calculation process performed by the calculation data display device.

FIGS. 4A–4F each illustrate a display operation corresponding to a key operation involved in the general calculation process performed by the calculation data display device.

Figure 4A:
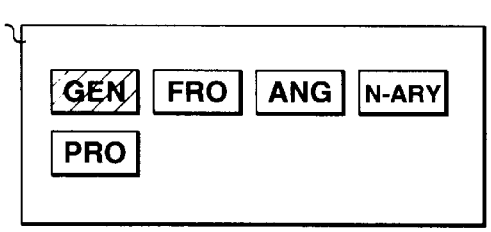
FIGS. 4A–4F each illustrate a display operation corresponding to a key operation involved in the general calculation process performed by the calculation data display device.
Figure 4B:
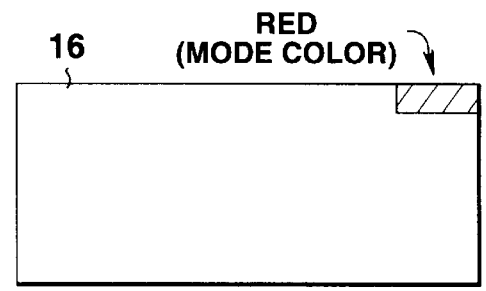

In the whole process of FIG. 2, when the "menu" 12c of the key-in unit 12 is first operated, the menu select screen is displayed on the display 16 to select a calculation mode in the device, as shown in FIG. 4A (step S1→S2).

In this case, for example, "GEN", "FUN", "ANG", "N-ARY" and "PRO" are selectable calculation modes, and these are displayed in different colors as indicating the general calculation mode, function calculation mode, angle calculation mode, N-ary calculation program mode, and program calculation mode, respectively.

When the cursor keys "", "⌈", "←" and "→" $12f_1$, $12f_2$, $12f_3$ and $12f_4$ are selectively operated to move the reverse display position in the menu selection operation, and when a calculation mode is selected and the "ENT" key 12g is operated, mode flag data corresponding to the selected calculation mode is set in the mode flag register M of RAM 14 and a mode display color indicative of the set calculation mode is displayed in an upper right-hand area of the display 16 (step S3→S4, S5→S6).

For example, when the "GEN" calculation mode is selected and set, "red" is displayed as the mode display color; when the "FUN" calculation mode is selected and set, "blue" is displayed as the mode display color; when the "ANG" calculation mode is selected and set, "yellow" is displayed as the mode display color; when the "N-ARY" calculation mode is selected and set, "green" is displayed as the mode display color; and when, the "PRO" calculation mode is selected and set, "orange" is displayed as the mode display color.

When any calculation mode is selected and set on the menu select screen in this way, a calculation corresponding to the selected menu is made (step SA, SB, SC, SD or SE).

More specifically, as shown in FIGS. 4A or B, when the general calculation mode "GEN" of the menu select screen is selected and set, and the corresponding mode color "red" is displayed on the upper right-hand corner of the display 16, the general calculation of FIG. 3 is started up (step S3→SA).

Figure 4C:
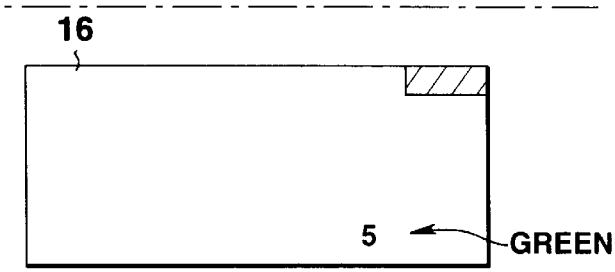

When in the general calculation of FIG. 3, the numeral input key sub-unit 12a is operated to input, for example, "5" to calculate "5+31=", as shown in FIG. 4C, the input numerical data "5" is displayed in the basic display color "green" on the display 16 in the general calculation mode (step A1→A2).

Since in this case no function data has been input, control returns to a step A1 where it is determined whether any key has been operated (step A3→END).

Figure 4D:
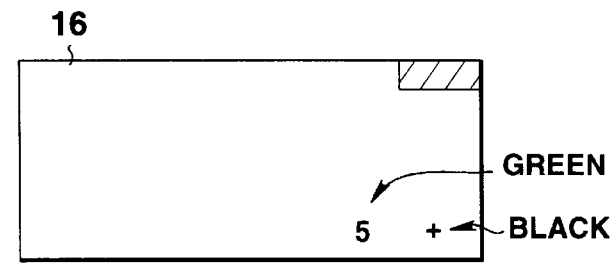

As shown in FIG. 4D, when the function/symbol key 12b is operated to input "+", the input function data "+" is displayed in black (step A4→A5).

In this case, as the function data "+" is input, the corresponding calculation is made and its result is displayed. Since the input calculation or operation expression at this time is "5+" alone, no actual calculation is made and control again returns to step A1 directed to determination of the key operation (step A6, A7, END).

Figure 4E:
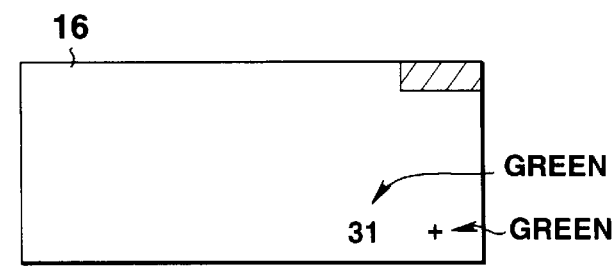

When the numeral input keys 12a are operated to input "31", as shown in FIG. 4E, in the state where "5" and "+"

are displayed in green and black, respectively, the input numerical data "31" is displayed in green and the already input and displayed function data "+" is also changed to and displayed in green (step A1→A2, A3→A8).

As shown in FIG. 4D, when the function data "+" is displayed in black, it is recognized that the function data "+" has been input just now. As shown in FIG. 4E, when the function data "+" has changed to green immediately after the numerical data "31" has been input, it is recognized that the function data "+" had been already input before the numerical data "31" was input.

Figure 4F:
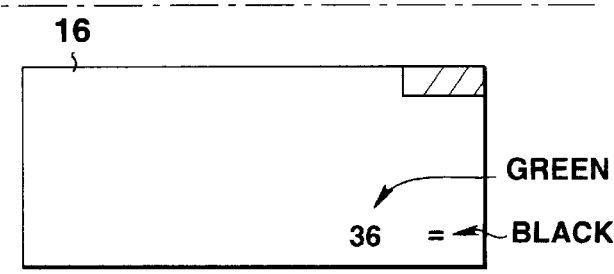

As shown in FIG. 4F, when the function/symbol key $12b$ "=" of the key-in unit 12 is operated, the function data "=" input this time is displayed in black instead of the function data "+" displayed so far in green (step A4→A5).

This causes the input and displayed calculation "5+31=" to be made and the result of the calculation is displayed as "36" (step A6, A7).

Thus, as the calculation or operation expression is input in the general calculation, function data included in the calculation expression is displayed in black only for the duration from the time when the function data was input to the time when the next numerical data is input. Thus, the user can recognize at a glance whether the data to be input next is numerical or function data. Thus, a possible mistake is prevented from occurring in the inputting order of terms of the calculation expression.

Figure 5:
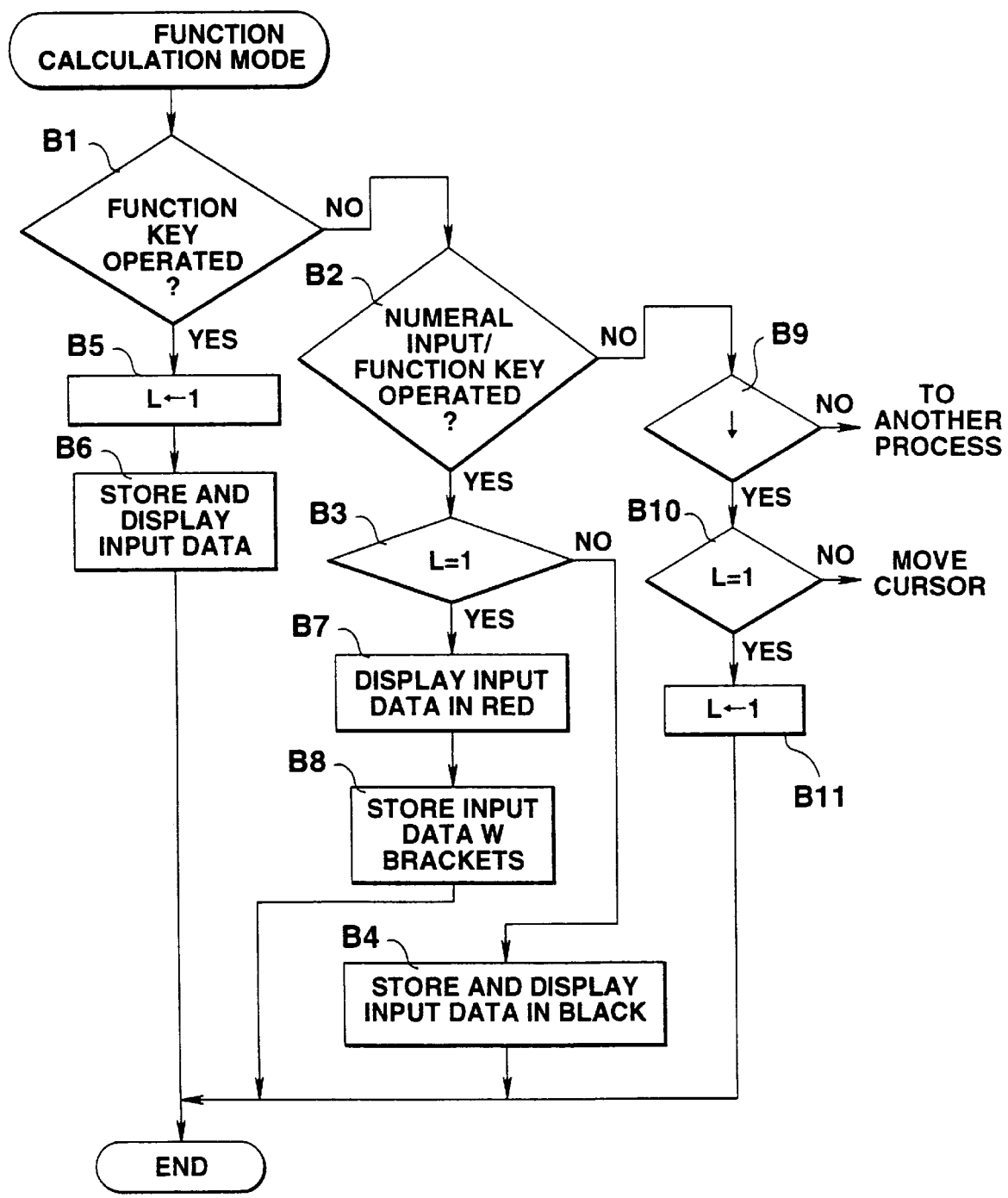
FIG. 5 is a flow chart indicative of a function calculation process performed by the calculation data display device.

FIG. 5 is a flow chart indicative of a function calculation process performed by the calculation data display device.

Figure 6A:
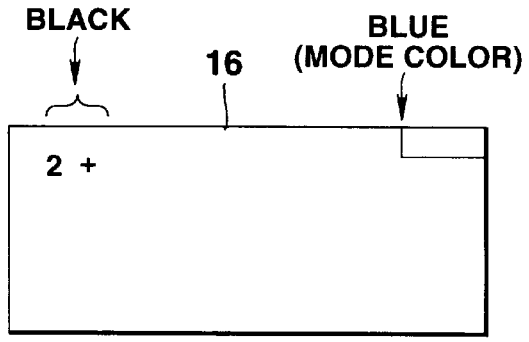
FIGS. 6A–6C each illustrate a display operation corresponding to a key operation involved in the function calculation process performed by the calculation data display device.
Figure 6B:
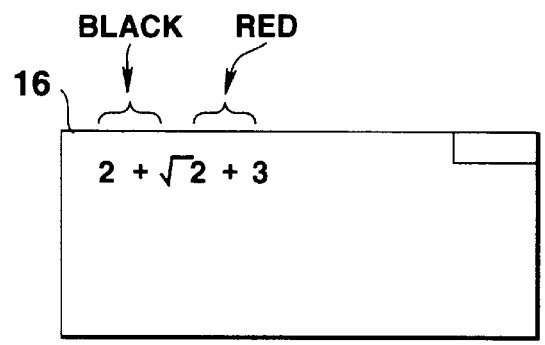
Figure 6C:
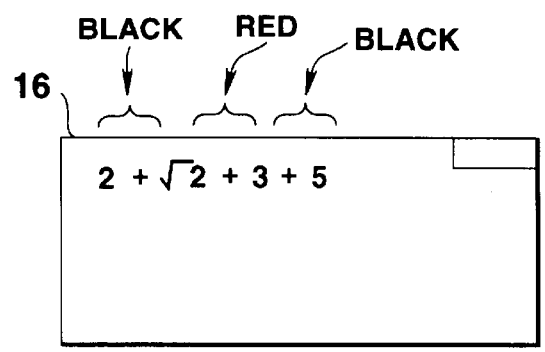

FIGS. 6A–6C each illustrate a display operation corresponding to a key operation involved in the function calculation process performed by the calculation data display device.

When the function calculation mode is selected and set in the menu selection screen, data indicative of the function calculation mode is set in the mode flag register M of RAM 14, and the "blue" mode display color is displayed in the upper right-hand corner of the display 16 to thereby start up the front function calculation of FIG. 5 (step S3-S6→SB).

When in the function calculation of FIG. 5 the numeral input key $12a$ and function/symbol key $12b$ of the key-in unit 12 are operated to input "2+", as shown in FIG. 6A, in order to calculate "2+√(2+3)+5", it is determined that no "1" is set in the function key register L of RAM 14. Thus, the input data "2+" is stored in the data storage $14b$ of RAM 14 and displayed in black on the display 16 (step B1→B2→B3→B4).

As shown in FIG. 6B, when the function/symbol key $12b$ is operated to input "√" data, "1" is set in the function key register L of RAM 14 and "√" data is stored and displayed on the display 16 subsequently to the "2+" stored already in the data storage $14b$ (step B1→B5, B6).

When the numeral input keys $12a$ and function symbol key $12b$ are operated to input "2+3" as numerical data covered by the square root "√" symbol, it is determined that "1" has been set in the function key register L of RAM 14. Thus, the input numerical data "2+3" is displayed in red and "√(2+3)" is stored in the data storage $14b$ (step B2→B3→B7, B8).

As shown in FIG. 6C, when the "⌈" key $12f_2$ is operated, it is determined that "1" has been set in the function key register L. Thus, the register L is reset at "0" (step B9→B10→B11).

When the function/symbol key $12b$ and numeral input key $12a$ are then operated to input "+5", it is determined that no "1" is set in the function key register L. Thus, "+5" is stored subsequently to "2+√(2+3)" stored so far in the data storage $14b$ and displayed in black on the display 16 (step B2→B3→B4).

Thus, in the function calculation, the numerical data and function data input subsequently to the operation of the prefix operator keys "sin", "cos", "tan" or "√" are displayed in red until the "⌈" key $12f_2$ is operated and the range of data covered by the prefix operator keys is displayed and stored in brackets "()" and the corresponding calculation is made. Thus, the range of data covered by the prefix operator keys is not required to be keyed in "()", and is discriminated and displayed in a different color, and hence inputting the calculation expressions is simplified.

Figure 7:
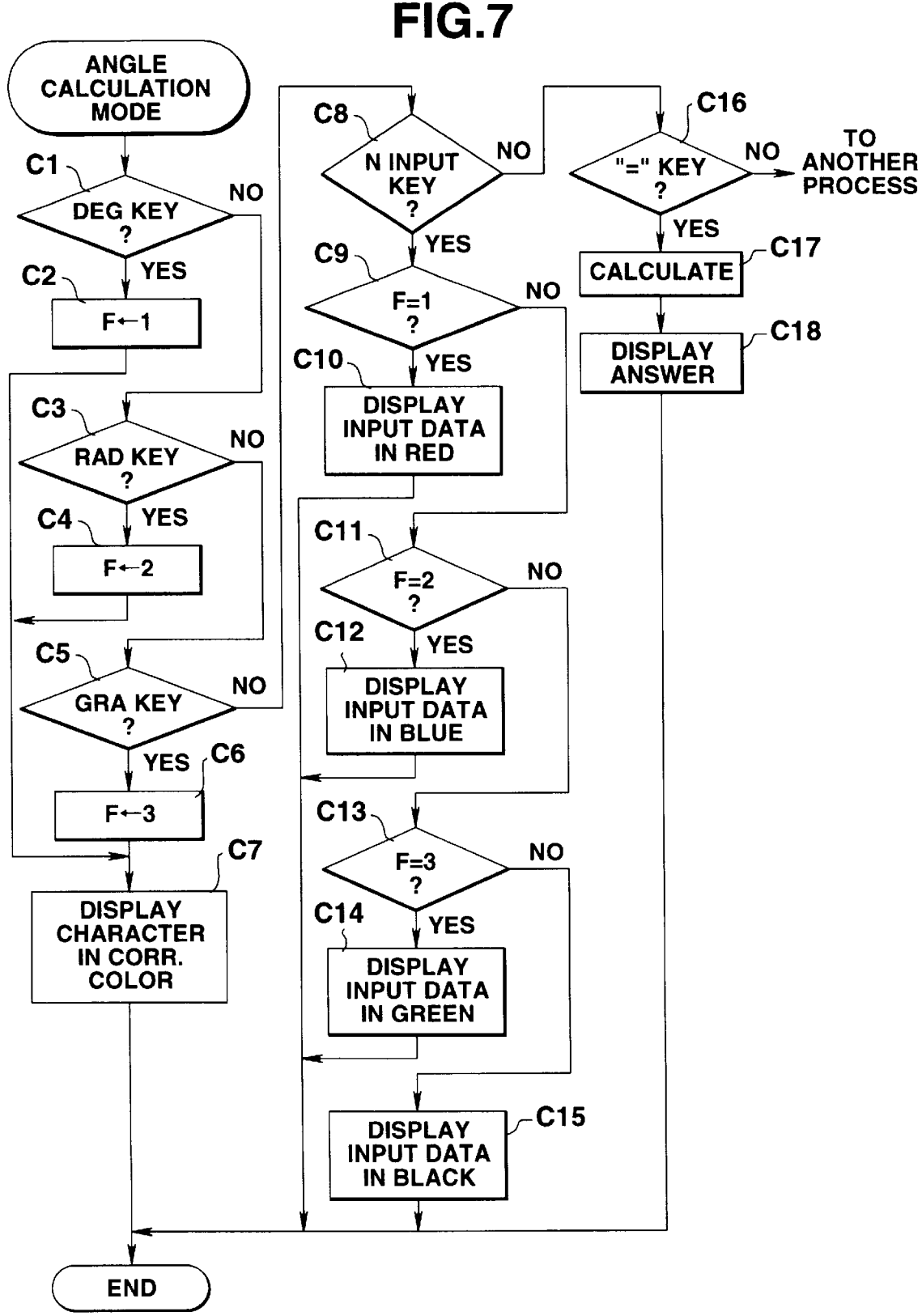
FIG. 7 is a flow chart indicative of an angle calculation process performed by the calculation data display device.

FIG. 7 is a flow chart indicative of an angle calculation process performed by the calculation data display device.

Figure 8:
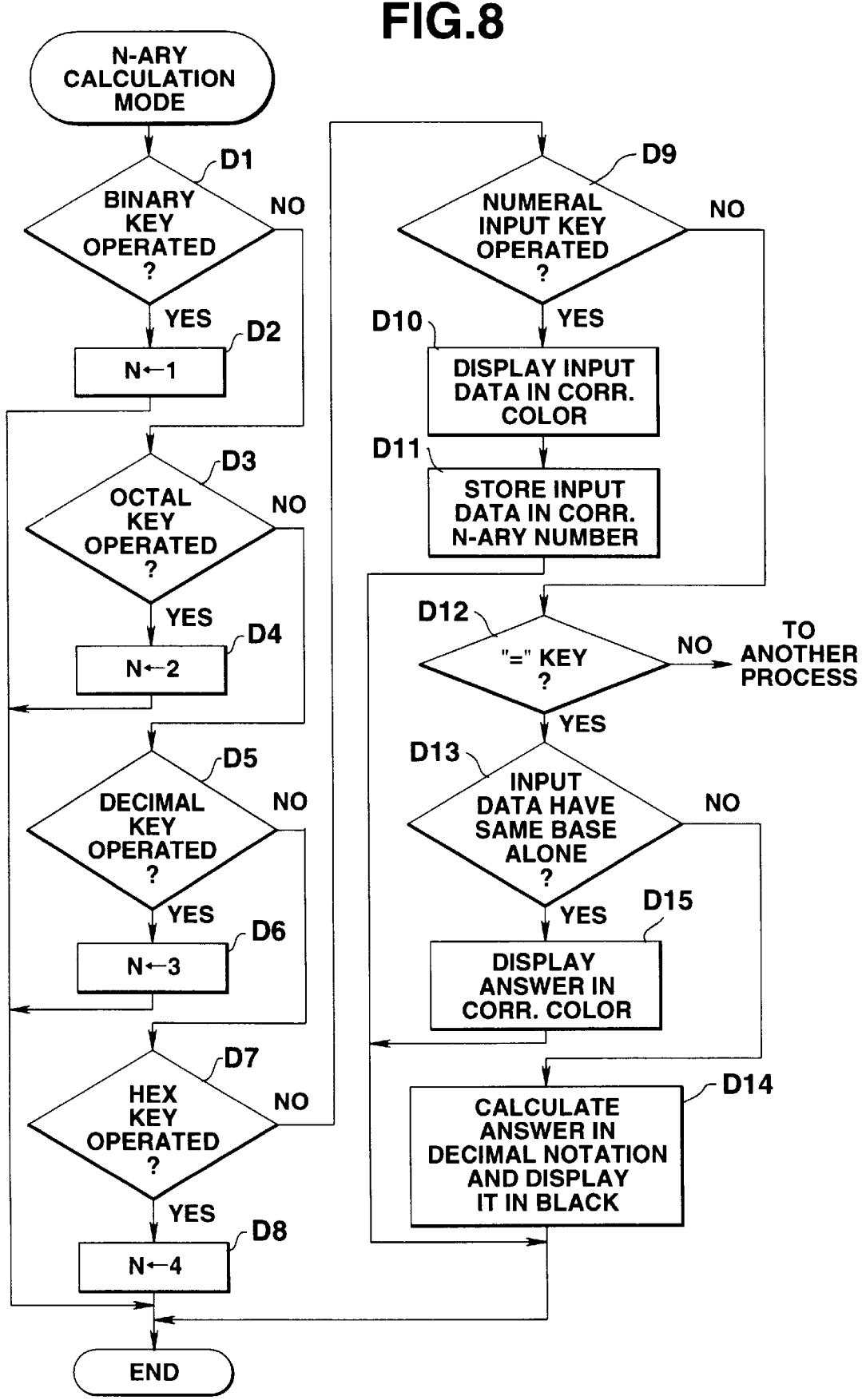
FIG. 8 is a flow chart indicative of an N-ary calculation process performed by the calculation data display device.

FIG. 8 is a flow chart indicative of an N-ary calculation process performed by the calculation data display device.

Figure 9A:
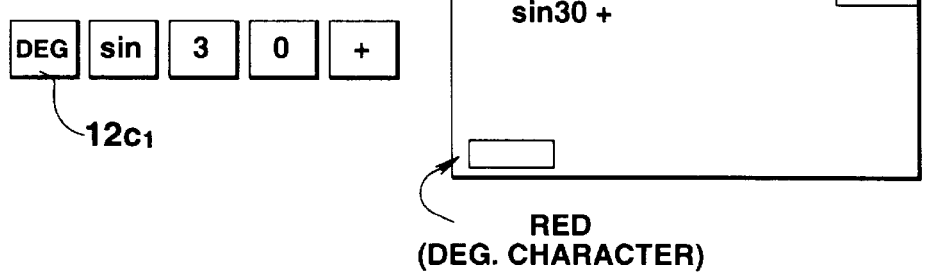
FIGS. 9A and 9B each illustrate a display operation corresponding to a key operation involved in an angle calculation process performed by the calculation data display device.

FIGS. 9A and B each illustrate a display operation corresponding to a key operation involved in the angle calculation process performed by the calculation data display device.

Figure 10A:
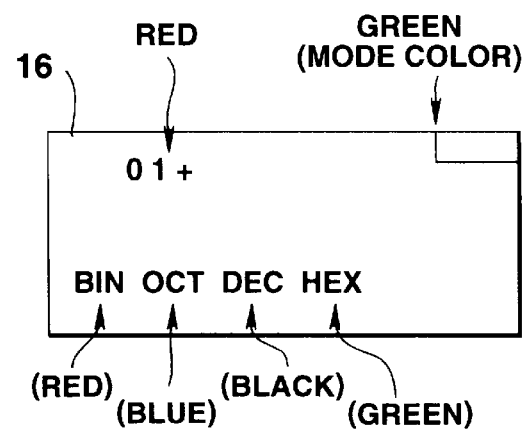
FIGS. 10A and 10B each illustrate a display operation corresponding to a key operation involved in the N-ary calculation process performed by the calculation data display device.

FIGS. 10A and B each illustrate a display operation corresponding to a key operation involved in the N-ary calculation process performed by the calculation data display device;

When the angle calculation mode is selected and set in the menu select screen, data indicative of the angle calculation mode is set in the mode flag register M of RAM 14 and displayed in yellow in the upper right-hand corner of the display 16 to thereby start up the angle calculation of FIG. 7 (steps S3-S6→SC).

When the "DEG" key $12c_1$ of the key-in unit 12 is operated in the angle calculation of FIG. 7, "1" is set in the angle key register F of RAM 14 (step C1→C2); when the "RAD" key $12c_2$ is operated, "2" is set in the angle key register F (step C3→C4); and when the "GRA" key $12c_3$ is operated, "3" is set in the angle key register F (step C5→C5).

When the "DEG" key $12c_1$ is operated, a red character indicative of the set "DEG" is displayed at the lower left-hand corner of the display 16 (step C7).

When the "RAD" key $12c_2$ is operated, a blue character indicative of the set "RAD" is displayed at the lower left-hand corner of the display 16 (step C7).

When the "GRA" key $12c_3$ is operated, a green character indicative of the set "GRA" is displayed at the lower left-hand corner of the display 16 (step C7). Once a colored character is displayed on the display, it continues to be displayed until the mode concerned is terminated.

When the numeral input key $12a$ is operated subsequently to the operation of the angle setting key, the numeral data input subsequently to the operation of the "DEG" key $12c_1$ is displayed in red (step C8→C9→C10) in the set "DEG" state where "1" is set in the angle key register F. The numeral data input subsequently to the operation of the "RAD" key $12c_2$ is displayed in blue (step C8→C11→C12) in the set "RAD" state where "2" is set in the angle key register F. The numeral data input subsequently to the operation of the "GRA" key $12c_3$ is displayed in green (step C8→C13→C14) in the set "GRA" state where "3" is set in the angle key register F.

When no particular angle unit has been set, or when "0" has been set in the angle register F, numerical data input by the numeral input key $12a$ is displayed in black (step C8→C15).

For example, when the "DEG" key $12c_1$ is first operated, as shown in FIG. 9A, to calculate "DEG sin 30+GRA cos 60=", "1" is set in the angle key register F and a red character indicative of the set angle unit "DEG" is displayed in the lower left-hand corner of the display 16 (step C1→C2, C7).

When "sin 30+" is then input, its numerical data "30" is displayed in red as data having the "DEG" unit (step C8→C9→C10).

Figure 9B:
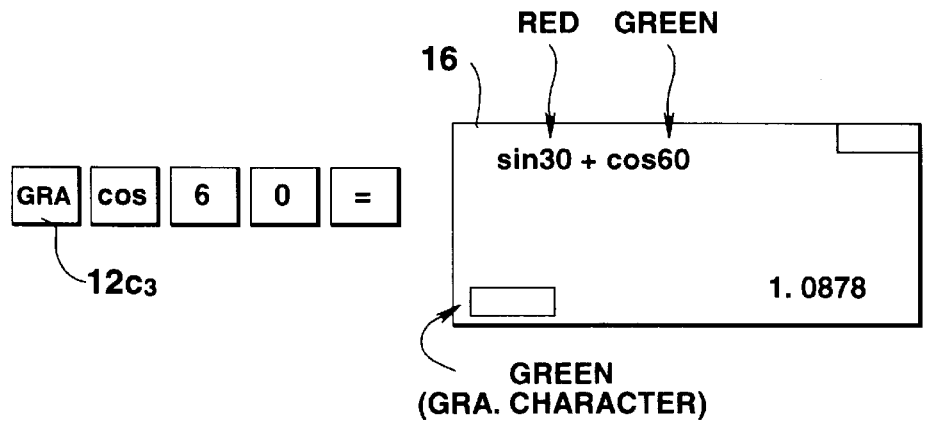

When the "GRA" key $12c_3$ is then operated, as shown in FIG. 9B, "3" is set in the angle key register F and a green character indicative of the set angle unit "GRA" is displayed in the lower left-hand corner of the display 16 (step C5→C6, C7).

When "cos 60" is then input, its numerical data "60" is displayed in green as data having the "GRA" unit (step C8→C13→C14).

When "=" is then input, the calculation "DEG sin 30+GRA cos 60" is made and the result of the calculation is displayed as "1.0878" (step C16→C17, C18).

Thus, in the angle calculation, a color character corresponding to the angle unit set at present is displayed at the lower left-hand area of the display 16 depending on the operation of the "DEG" key $12c_1$, "RAD" key $12c_2$ or "GRA" key $12c_3$, and the keyed-in numerical data is displayed in the same color as the set angle unit color character. Thus, the angle unit set at present and the angle units corresponding to the respective numerical data included in the calculation expression can be recognized at a glance.

When the N-ary calculation mode is set in the menu select screen, data indicative of the N-ary calculation mode is set in the mode flag register M of RAM 14 and the corresponding display color "green" is displayed at the upper right-hand corner of the display 16 to thereby start up the N-ary calculation of FIG. 8 (steps S3–S6→SD).

In the state where the N-ary calculation process has been started up, characters "BIN", "OCT", "DEC" and "HEX" indicative of binary, octal, decimal and hexadecimal bases are arranged and displayed in red, blue, black and green, respectively, in the lower left-hand area of the display 16.

When the "BIN" key $12d_1$ of the key-in unit 12 is operated in the N-ary calculation of FIG. 8, "1" is set in the N-ary key register N of RAM 14 (step D1→D2). When the "OCT" key $12d_2$ is operated, "2" is set in the N-ary key register N (step D3→D4). When the "DEC" key $12d_3$ is operated, "3" is set in the N-ary key register N (step D5→D6). When the "HEX" key $12d_4$ is operated, "4" is set in the N-ary key register N (step D7→D8).

When the numeral input key 12a is operated subsequently to the operation of the N-ary setting key, the numerical data input subsequently to the operation of the "BIN" key $12d_1$ is displayed in red and stored as the binary data in the data storage 14b, in the "BIN" state where "1" is set in the N-ary key register N. The numerical data input subsequently to the operation of the "OCT" key $12d_2$ is displayed in blue and stored as the octal data in the data storage 14b, in the "OCT" state where "2" is set in the N-ary key register N. The numerical data input subsequently to the operation of the "DEC" key $12d_3$ is displayed in black and stored as the decimal data in the data storage 14b, in the "DEC" state where "3" is set in the N-ary key register N. The numerical data input subsequently to the operation of the "HEX" key $12d_4$ is displayed in green and stored as the hexadecimal data in the data storage 14b, in the "HEX" state where "4" is set in the N-ary key register N (step D9→D10, D11).

When, for example, the "BIN" key $12d_1$ is operated, as shown in FIG. 10A, to calculate "BIN 01+HEX AB=", "1" is set in the N-ary register N (step D1→D2).

When "01+" is then input, its numerical data "01" is displayed in red as binary data and stored in the data storage 14b (step D9→D10, D11).

Figure 10B:
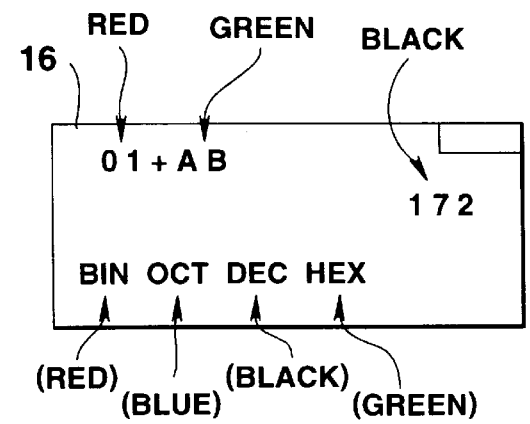

Subsequently, when the "HEX" key $12d_4$ is operated, as shown in FIG. 10B, "4" is set in the N-ary register N (step D7→D8).

When the "AB" is then input, its numerical data "AB" is displayed in green as hexadecimal data and stored in the data storage 14b (step D9→D10, D11).

When the "=" is then input, it is determined whether the calculation expression stored in the data storage 14b is composed of only numerical data having the same base (step D12→D13).

In this case, since the calculation expression "01+AB" stored in the data storage 14b is composed of binary data and hexadecimal data, it is determined that the calculation expression is not composed of numerical data having the same base. Thus, those data are converted to corresponding decimal data which are then added and the result of the calculation is displayed in black as "172" (step D13→D14).

When it is determined that the calculation expression keyed in and stored in the data storage 14b includes numerical data having the same base, the calculation is made in accordance with the base data set in the N-ary key register N and the result data is displayed in the corresponding color (step D13→D15).

Thus, in the N-ary calculation, the characters "BIN", "OCT", "DEC" and "HEX" indicative of binary, octal, decimal and hexadecimal numbers are arranged and displayed in red, blue, black and green, respectively, in the lower left-hand area of the display 16, the respective numerical data of the calculation expression are displayed in different colors corresponding to their base characters. When the numerical data is all of the same base, the result of the calculation is displayed in the same color. When those data are of different bases, they are converted to decimal numbers, which are then operated and the result of the operation is displayed in black. Thus, the states in which the respective base units involved in the input calculation expression are set can be recognized at a glance.

Figure 11:
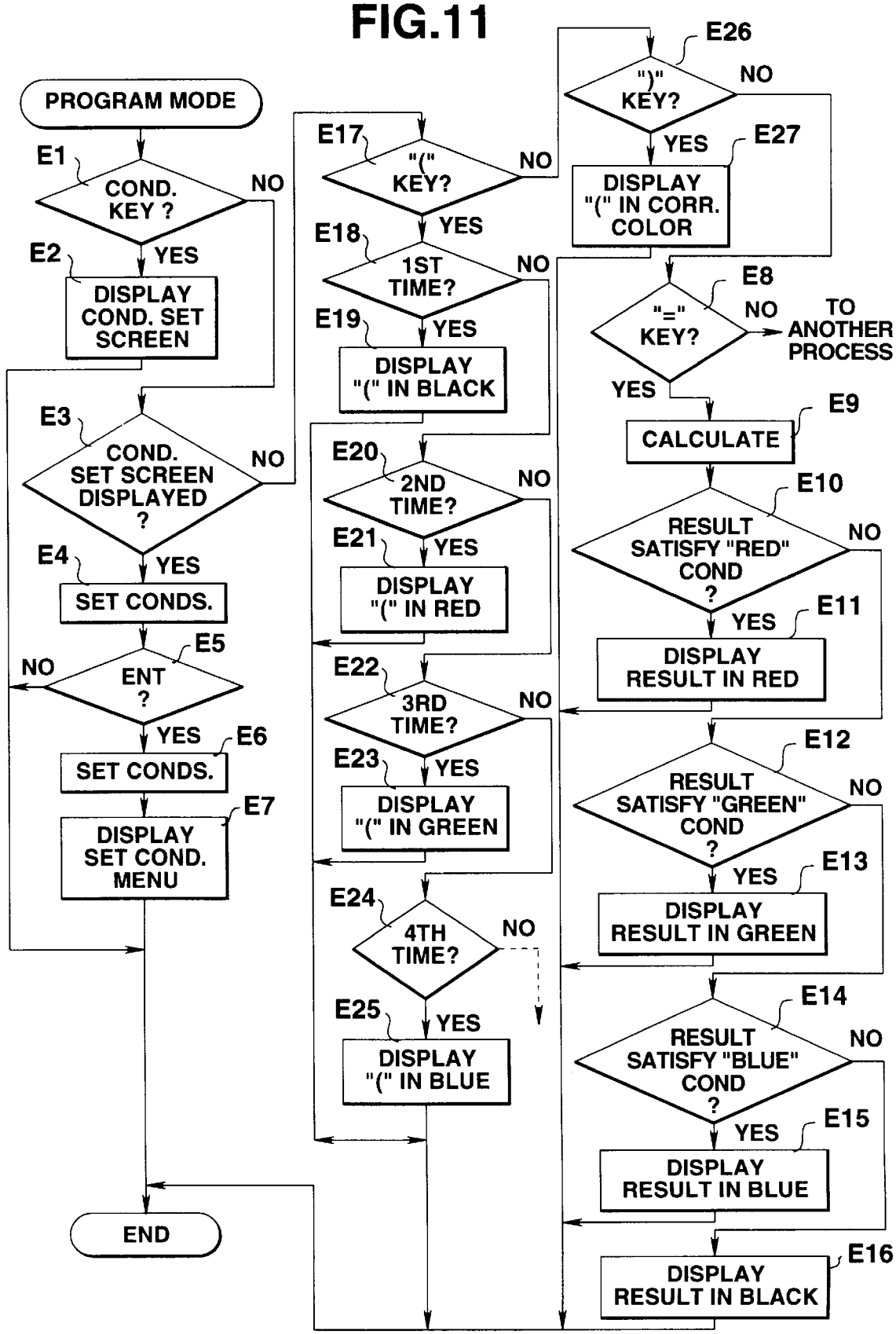
FIG. 11 is a flow chart indicative of a program calculation process performed by the calculation data display device.

FIG. 11 is a flow chart indicative of a program calculation process performed by the calculation data display device.

Figure 12A:
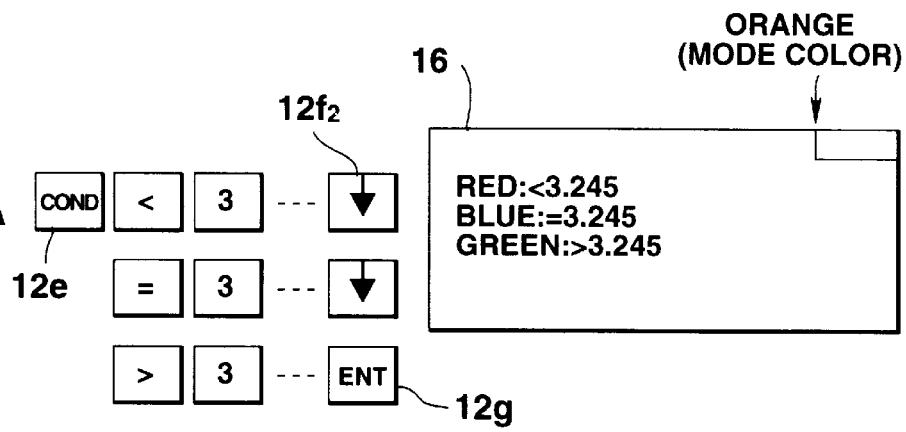
FIGS. 12A–12C each illustrate a display operation corresponding to a key operation involved in a condition setting calculation routine of the program calculation process performed by the calculation data display device.
Figure 12B:
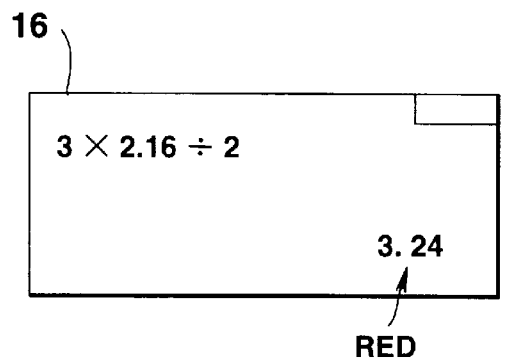
Figure 12C:
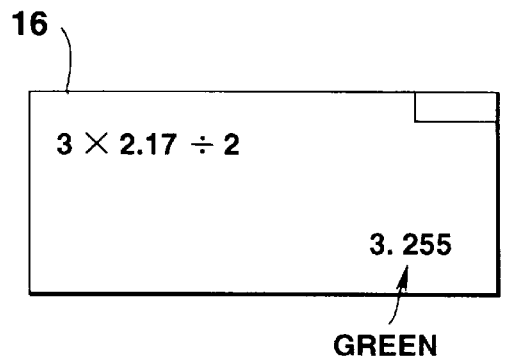

FIGS. 12A–12C each illustrate a display operation corresponding to a key operation involved in the condition setting calculation routine of the program calculation process performed by the calculation data display device.

Figure 13A:
FIGS. 13A and 13B each illustrate a display operation involved in the inputting operation of a calculation or operation expression in the program calculation process performed by the calculation data display device.
Figure 13A:
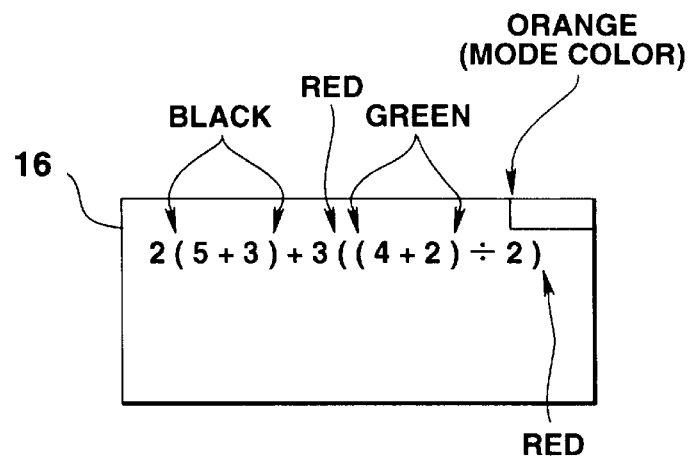
Figure 13B:
Figure 13B:
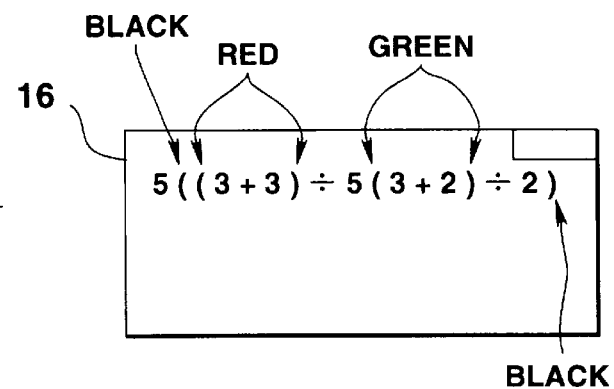

FIGS. 13A and 13B each illustrate a display operation corresponding to a key operation involved in the inputting operation of a calculation expression in the program calculation process performed by the calculation data display device.

When the program calculation mode is set in the menu select screen, data indicative of the appropriate program calculation mode is set in the mode flag register M of RAM 14, a mode display color "orange" is set in the upper right-hand corner of the display screen 16, and the program calculation process of FIG. 11 is started up (steps S3→S6→SE).

When the "COND" key 12e of the key-in unit 12 is operated in the program calculation process of FIG. 11, the condition setting display screen in which the three calculation conditions expressed by "RED", "BLUE" and "GREEN" are set and displayed on the display 16, as shown in FIG. 12A (step E1→E2).

When in the state where the condition setting display screen has been displayed, the cursor is moved to "RED", "<3.245" is input and; "⌈" key 12$f_2$ is then operated; the cursor is then moved to "BLUE", "=3.245" is input; "⌈" key 12$f_2$ is then operated; the cursor is then moved to "GREEN" and ">3.245" is input to indicate a range of the result of the calculation; and "ENT" key 12$g$ is then operated, the three input conditions are stored in correspondence to respective color data in the data storage 14$b$, and conditions are set in which "RED" is displayed when the result of the calculation is "smaller than 3.245"; "BLUE" is displayed when it is "equal to 3.245"; "GREEN" is displayed when it is "larger than 3.245" (step E3→E4, E5→E6).

A display corresponding to the set condition menu then appears (in this case, a blank display screen before the calculation expression is input appears) (step E7).

As shown in FIG. 12B, when the numeral input key 12$a$ and function/symbol keys 12$b$ of the key-in unit 12 are operated in combination to input, for example, "3×2.16+2=", this calculation expression is stored in the data storage 14$b$ of RAM 14 and the corresponding calculation concerning the calculation expression E8→E9).

In this case, when it is determined that the result of the calculation of the expression "3×2.16+2=" is "3.24", which corresponds to the red display indicative of the set conditions "being smaller than 3.245", the result of the calculation "3.24" is displayed in red (step E10→E11).

As shown in FIG. 12C, when the numeral input key sub-unit 12$a$ and function/symbol keys 12$b$ of the key-in unit 12 are operated in combination to input a calculation expression, for example, of "3×2.17÷2=", this calculation expression is stored in the data storage 14$b$ of RAM 14 and the corresponding calculation is made (step E8–E9).

In this case, when it is determined that the result of the calculation of the expression "3×2.17+2=" is "3.255", which corresponds to the green display indicative of the set conditions "being larger than 3.245", the result of the calculation "3.255" is displayed in green (step E12→E13).

In addition, when it is determined that a calculation expression is input and the result of the calculation is "3.245", which corresponds to the blue display indicative of the set conditions "being equal to 3.245", the result of the calculation "3.245" is displayed in blue (step E8–E9, E14→E15).

When the result of the calculation does not satisfy any conditions, data on the result of the calculation is displayed in black (step E16).

Thus, in the condition setting calculation routine of the program calculation process, three different color data are stored in correspondence to the conditions set optionally and data on the results of the calculation are displayed in different colors corresponding to the respective set conditions. Thus, the user can recognize at a glance what conditions the result of the calculation belongs to.

When a calculation expression using a plurality of pairs of brackets "()" is input, as shown in FIG. 13A or B, and it is determined that the bracket "(" key has been operated at a first time, the bracket "(" symbol is displayed in black (step E17→E18→E19). When it is determined that the bracket "(" key has been operated at a second time, the bracket "(" symbol is displayed in red (step E17→E20→E21). When it is determined that the bracket "(" key is operated at a third time, the bracket "(" symbol is displayed in green (step E17→E22→E23). When it is determined that the bracket "(" key is operated at a fourth time, the bracket "(" symbol is displayed in blue (step E17→E24→E25).

When the ")" key is operated, it is displayed in the same color as the opposing "(" symbol of brackets "()" of the pair concerned (step E26→E27).

Thus, even when many pairs of brackets "()" symbols are used in a single calculation expression, the respective pairs of "()" symbols are displayed in different colors to be recognized at a glance.

Thus, according to the calculation data display device, if, for example, the square root key is operated as a calculation or operation expression is input when a function calculation is made, numerical data/function data input subsequently to the square root symbol are displayed in a color different from the basic display color to thereby indicate that they are calculation data covered by and processed as belonging to the square root symbol. If the "↓" key 12$f_2$ is operated, the subsequent input numerical data/function data are displayed in the basic display color to thereby indicate that those data are not covered by the square root symbol and are processed as regular data. Thus, the range of data covered by a specified symbol in a calculation or operation expression to be input is not required to be inputted in a bracketed manner but can be recognized at a glance.

While in the respective embodiments the display color of calculation data has been illustrated as being changed to recognize the state and kind of the calculation data, for example, the displayed font of letters and numerals involved in the numerical data may be changed to achieve the same purpose. Alternatively, characters may be displayed in italics or by means of reverse display to achieve the same purpose. Many changes and modifications could be made by those skilled in the art without departing from the spirit and scope of the invention defined in the accompanying claims.

What is claimed is:

1. A calculation data display device comprising:
   a calculation data input unit for inputting calculation data including numerical data and function data;
   a display for displaying the calculation data inputted by said calculation data input unit;
   specifying means for specifying one of a base and angle unit to be given to the numerical data inputted by said calculation data input unit;
   display control means for controlling said display to display the calculation data inputted by said calculation data input unit in a display form depending on the one of the base and angle unit specified by said specifying means; and
   presenting means for presenting a meaning of the display form displayed on said display;
   wherein said display control means comprises a display color setting means for setting a display color of the calculation data inputted by said calculation data input unit as the display form depending on the one of the base and angle unit specified by said specifying means.

2. The calculation data display device according to claim 1, wherein said presenting means comprises a plurality of different sub-displays displayed on said display for indicating the display form of the calculation data depending on the one of the base and angle unit specified by said specifying means.

3. The calculation data display device according to claim 1, wherein said display control means comprises means responsive to the numerical data being inputted by said calculation data input unit for controlling said display to display the inputted numerical data in the display form.

4. A calculation data display device comprising:
   a calculation data input unit for inputting calculation data including numerical data and function data;
   a display for displaying the calculation data inputted by said calculation data input unit;

specifying means for specifying one of a base and angle unit to be given to the numerical data inputted by said calculation data input unit;

display control means for controlling said display to display the calculation data inputted by said calculation data input unit in a display form depending on the one of the base and angle unit specified by said specifying means; and presenting means for presenting a meaning of the display form displayed on said display;

wherein said display control means comprises a display font setting means for setting a display font of the calculation data inputted by said calculation data input unit as the display form depending on the one of the base and angle unit specified by said specifying means.

5. The calculation data display device according to claim 4, wherein said presenting means comprises a plurality of different sub-displays displayed on said display for indicating the display form of the calculation data depending on the one of the base and angle unit specified by said specifying means.

6. The calculation data display device according to claim 4, wherein said display control means comprises means responsive to the numerical data being inputted by said calculation data input unit for controlling said display to display the inputted numerical data in the display form.

7. A calculation data display device comprising:

a calculation data input unit for inputting calculation data including numerical data and function data;

symbol input means for inputting a plurality of pairs of symbols, each pair of symbols being used together, a first one of the symbols of each said pair representing a start of the calculation data inputted by said calculation data input unit and a second one of the symbols of each said pair representing an end of the calculation data inputted by said calculation data input unit;

a display for displaying the symbols inputted by said symbol input means and the calculation data inputted by said calculation data input unit; and display control means for controlling said display to display in different display forms a first pair of the plurality of symbols inputted by said symbol input means and a second pair of the plurality of symbols inputted by said symbol input means.

8. The calculation data display unit according to claim 7, wherein said symbol input means comprises bracket symbol input means for inputting a pair of bracket symbols.

9. The calculation data display unit according to claim 7, wherein said display control means comprises display color control means for controlling said display to display the first pair of the symbols inputted by said symbol input means in a display color which is different from that in which the second pair of symbols is displayed.

10. A calculation data display device comprising:

a calculation data input unit for inputting calculation data including numerical data and function data;

a display for displaying the calculation data inputted by said calculation data input unit;

prefix operator input means for inputting a prefix operator for the calculation data inputted by said calculation data input unit;

subordinating means for subordinating at least a portion of the calculation data inputted by said calculation data input means to the prefix operator inputted by said prefix operator input means; and display control means for controlling said display to display the subordinated calculation data in a display form which distinguishes the subordinated calculation data;

wherein said display control means comprises display color control means for controlling said display to display the subordinated calculation data in a display color which distinguishes the subordinated calculation data.

11. The calculation data display device according to claim 10, wherein said prefix operator input means comprises means for inputting a root symbol as the prefix operator.

12. A calculation data display device comprising:

a calculation data input unit for inputting calculation data including numerical data and function data;

a display for displaying the calculation data inputted by said calculation data input unit;

prefix operator input means for inputting a prefix operator for the calculation data inputted by said calculation data input unit;

subordinating means for subordinating at least a portion of the calculation data inputted by said calculation data input means to the prefix operator inputted by said prefix operator input means; and display control means for controlling said display to display the subordinated calculation data in a display form which distinguishes the subordinated calculation data;

wherein said display control means comprises a display font setting means for setting a display font for distinguishing the subordinated calculation data.

13. The calculation data display device according to claim 12, wherein said prefix operator input means comprises means for inputting a root symbol as the prefix operator.

14. A calculation data display method comprising the steps of:

inputting calculation data including numerical data and function data;

inputting along with the calculation data a plurality of pairs of symbols, a first one of the symbols of each said pair representing a start of the inputted calculation data and a second one of the symbols of each said pair representing an end of the inputted calculation data;

displaying first and second pairs of the plurality of pairs of symbols in different display forms.

15. A recording medium containing a computer readable program which enables a computer to function as means for:

inputting calculation data including numerical data and function data;

inputting along with the calculation data a plurality of pairs of symbols, a first one of the symbols of each said pair representing a start of the inputted calculation data and a second one of the symbols of each said pair representing an end of the inputted calculation data;

displaying first and second pairs of the plurality of pairs of symbols in different display forms.

* * * * *